US006813902B2

(12) United States Patent
Streicher et al.

(10) Patent No.: US 6,813,902 B2
(45) Date of Patent: Nov. 9, 2004

(54) SYSTEMS AND METHODS FOR INCREASING PRODUCTION OF SPHEROIDAL GLASS PARTICLES IN VERTICAL GLASS FURNACES

(75) Inventors: Eric Streicher, Viroflay (FR); John Foss, Naperville, IL (US); Mahendra L. Joshi, Allentown, PA (US); Harley A. Borders, Highlands Ranch, CO (US)

(73) Assignees: American Air Liquide, Inc., Fremont, CA (US); Air Liquide America, L.P., Houston, TX (US); L'Air Liquide S.A., Paris (FR)

( * ) Notice: Subject to any disclaimer, the term of this patent is extended or adjusted under 35 U.S.C. 154(b) by 39 days.

(21) Appl. No.: 09/981,740

(22) Filed: Oct. 19, 2001

(65) Prior Publication Data

US 2002/0121108 A1 Sep. 5, 2002

Related U.S. Application Data

(60) Provisional application No. 60/244,658, filed on Apr. 1, 2000.

(51) Int. Cl.[7] .............................................. C03B 19/10
(52) U.S. Cl. ..................... 65/21.1; 65/134.4; 65/142; 432/195; 432/196
(58) Field of Search ..................... 65/142, 21.1, 21.2, 65/21.3, 21.4, 21.5, 135.9, 134.4, 136.1, 347, 335; 432/195, 196

(56) References Cited

U.S. PATENT DOCUMENTS

| 2,619,776 | A | * | 12/1952 | Potters ........................ 65/21.3 |
| 2,838,881 | A | * | 6/1958 | Plumat ......................... 65/142 |
| 2,958,161 | A | * | 11/1960 | Palmer ......................... 432/13 |
| 5,611,833 | A | * | 3/1997 | Brahmbhatt et al. .......... 65/21.3 |

* cited by examiner

Primary Examiner—Sean Vincent
(74) Attorney, Agent, or Firm—Linda K. Russell; Christopher J. Cronin

(57) ABSTRACT

A retrofit technology for air-fuel fired, vertical glass furnace for oxygen firing or boosting to provide additional heat to the process to increase furnace production capacity. The additional firing using oxygen is strategically controlled to enable enhanced radiation from oxygen flame for the spheroidizing process without negative effects on the overall process. With proper implementation, an increased production from 50% to 200%, depending on the size of the spheres, can be achieved while maintaining acceptable product quality. Processes in accordance with the present invention can be performed using one of a number of methods of oxygen boosting.

26 Claims, 5 Drawing Sheets

# SYSTEMS AND METHODS FOR INCREASING PRODUCTION OF SPHEROIDAL GLASS PARTICLES IN VERTICAL GLASS FURNACES

This application is related and claims priority under 35 U.S.C. §119(e) to U.S. provisional application Ser. No. 60/244,658, filed Nov. 1, 2000, the entire contents of which are incorporated by reference herein.

BACKGROUND OF THE INVENTION

1. Field of the Invention

The present invention relates to vertically oriented glass furnaces which have been useful for producing spheroidal glass particles, and methods of operation of such furnaces.

2. Brief Description of the Related Art

Commercial glass particles typically are available in sizes of 10 micrometers to 50 micrometers. They have wide applications such as in electronics, as a reflecting material used in paints (e.g., road signs, roadmarkings), construction material for runways (night landing strips), for grinding/sand blasting applications, injection molding of plastics, etc.

The glass beads are formed by a variety of methods (see, e.g., U.S. Pat. No. 4,961,770). In some cases, electrical and magnetic fields are used for breaking up molten glass streams into large particles and then injecting these particles within the core of a burner flame. The softened glass beads in the high temperature flame zone react and, due to surface tension, form into glass spheres of very small sizes (10 to 50 micrometers).

In many cases, a very large furnace (e.g., a water or air-cooled vertical reactor) is used for glass bead production (see, e.g., U.S. Pat. No. 4,046,548). As shown in FIG. 1 herein, the raw material R, which can include crushed glass or cullet in powder form, is fed by devices 110 from a raw material hopper 108 above the air-fuel burner flame region of the vertical reactor 102 of a typical vertical glass furnace 100. The combustion gas stream, which is traveling upwards, immediately entrains the raw material. The suspended glass particles in the high temperature combustion zone soften and, due to surface tension over the glass surface, form into tiny spheres. An average size of the resulting glass particles is dictated by the effective terminal velocity (and therefore residence time) of the particle and the average temperature of the surrounding combustion gases. It can be very important to maintain a uniform temperature profile in the furnace gases to produce a required size distribution for the final glass product.

The flame gases, and entrained air $A_i$ from open bottom 122 typically above a floor or ground 124, carry glass particles upward and, upon completion of spheroidizing process, they settle in a large furnace portion 104. The final product P is then conveyed along a product discharge path 120 to a sizing process, where proper size product is packed for shipment. In many cases, about 10% to 15% product remains with the furnace exhaust gas passing through flue 106, which requires additional separation process such as cyclonic separation, a bag house, or electrostatic precipitator (ESP), generally designated 114. Cleaned flue gases leave the separator at a stack 118.

As illustrated in FIG. 1, the recovered product $P_R$ from the bag-house, etc. 114 is typically recycled to the reactor 102 along a path 116. The furnace can typically process anywhere from 1000 lb/hr (453.6 kg/hr) to 10,000 lb/hr (4,536 kg/hr) of product, depending on the size. The air-fuel burners 112 generally produce a well-mixed bluish flame, which does not have much, if any, visible radiation. This flame also creates outside air infiltration (as shown in FIG. 1) $A_i$. The ambient air dilution lowers the average flame gas temperature, but increases overall combustion gas volume. This air infiltration causes two effects as far as the process is concerned:

(1) Increasing combustion gas volume, which is necessary for glass particles entrainment and the subsequent spheroidization process. Higher volume means higher entrainment.
(2) Lowering of average flame gas temperature, which limits the amount of raw-material which can be processed in the furnace.

In most cases, the furnace reaches a performance bottleneck, where the maximum raw material feed capacity is reached based on furnace diameter, overall length, total burner firing rate, and outside air entrainment. If additional raw material is added, the spherodizing process is negatively affected and the product quality can degrade and becomes an issue. Here, the product starts agglomerating in lumps due to poor heat transfer, insufficient entrainment, or due to localized hot-spots in the furnace. Most furnace operators therefore do not exceed furnace production capacity due to quality concerns. A need therefore remains to improve vertical glass furnace production levels while permitting glass quality to be retained.

SUMMARY OF THE INVENTION

According to a first aspect of the present invention, a process of operating a vertical glass bead furnace, the furnace including a shaft open at the bottom, a raw material addition device, and an air-fuel burner, comprises the steps of firing the air-fuel burner and thereby entraining air into the furnace shaft through the open bottom of the shaft, adding raw material into the furnace, and an additional step selected from the group consisting of: (a) injecting oxidant into the shaft adjacent to the shaft bottom using a single lance, (b) operating an oxy-fuel burner in the shaft adjacent to the shaft bottom, (c) injecting oxidant into the shaft adjacent to the shaft bottom using multiple lances, (d) injecting oxidant into the shaft using a lance incorporated into the air-fuel burner, and (e) injecting oxidant into the shaft adjacent to the shaft bottom using an oxidant injection ring.

According to another aspect of the present embodiment, a vertical glass furnace comprises a shaft having an interior space and open at the bottom, a raw material addition device mounted so add raw material to the interior of the shaft, an air-fuel burner, and an additional device selected from the group consisting of: (a) a single oxidant injection lance adjacent to the shaft bottom useful for injecting oxidant into the shaft, (b) an oxy-fuel burner in the shaft adjacent to the shaft bottom, (c) multiple oxidant injection lances adjacent to the shaft bottom useful for injecting oxidant into the shaft, (d) a lance incorporated into the air-fuel burner, and (e) an oxidant injection ring positioned for injecting oxidant into the shaft adjacent to the shaft bottom.

Still other objects, features, and attendant advantages of the present invention will become apparent to those skilled in the art from a reading of the following detailed description of embodiments constructed in accordance therewith, taken in conjunction with the accompanying drawings.

BRIEF DESCRIPTION OF THE DRAWINGS

The invention of the present application will now be described in more detail with reference to preferred embodiments of the apparatus and method, given only by way of example, and with reference to the accompanying drawings, in which.

DESCRIPTION OF THE PREFERRED EMBODIMENTS

Figure 1:
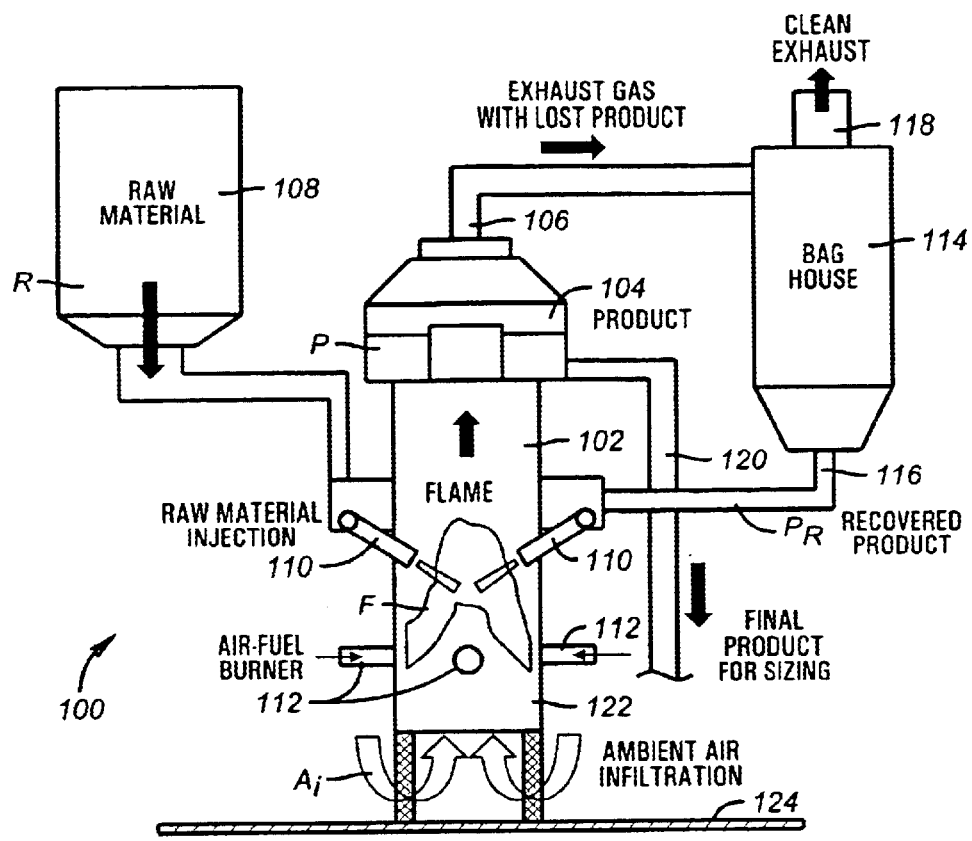
FIG. 1 illustrates a typical vertical glass furnace.

Referring to the drawing figures, like reference numerals designate identical or corresponding elements throughout the several figures.

Within the context of the present invention, the terms "oxygen" and "oxidant" include, but are not limited to: non-pure oxygen, including, but not limited to, oxidants having an oxygen content greater than 21%; oxygen-enriched air; and oxygen-enriched gases wherein the gases are other than pure air.

One aspect of the present invention relates to several oxygen boost technologies applicable on an air-fuel fired vertical glass furnace for producing spheroidal particles (with glass beads of various sizes). The vertical glass furnaces use air-fuel combustion burners to produce hot combustion gasses, which rise up from the bottom of the furnace at temperatures of approximately 2000° F. to 3000° F. Raw material (e.g., glass in powder form) is fed above the burner location and it is entrained in the upward moving combustion gas stream. The temperature of combustion gases is sufficiently above the softening point of the glass to allow surface tension to subsequently spheroidize the particles. During this spheroidizing process, the glass particles exchange heat energy by conduction (by random collision, fusion with other particles) and through radiation from hot combustion gases.

In a first exemplary method, the present invention uses an oxidant or oxygen jet at very high velocity from the bottom opening in the furnace. This high velocity oxidant or oxygen injection causes an ejector effect and entrains a very large amount of ambient air, up to 100 to 300 times in volume of the injected oxygen, from the bottom opening in the furnace. The oxygen enriched air mixes with air-gas burner combustibles to create flame gases at slightly higher temperature. This increase in air-gas flame temperature and additional entrainment of ambient air from the bottom create a faster spheroidization process.

In a second exemplary method, an oxy-fuel burner is fired upward at the same bottom location as an oxygen lance to create fuel-rich, luminous, and high-temperature oxy-fuel flame. The firing rate of the oxy-fuel burner can be adjusted anywhere from about 5% to 60% of the total furnace firing rate.

In a third exemplary method, the present invention uses multiple oxygen lances upstream of the air-fuel burner. The increased radiation of the (oxy-fuel) flame and subsequent mixing of oxy-fuel products of combustion with air-fuel products of combustion gases increase final gas temperatures. The temperature uniformity of the resulting combustion gases results in an increased spheroidization rate and therefore increased productivity. Production increases from 50% to 200% can be achieved over conventional air-fired systems.

Another aspect of the present invention includes providing a retrofit technology to an air-fuel fired, vertical glass furnace for oxygen firing or boosting to provide additional heat to the process, and thereby enable increased furnace production capacity. The additional firing using oxygen is strategically controlled to enable enhanced radiation from the oxygen flame for the spheroidizing process without negative effects on the overall process. With proper implementation, an increased production from 50% to 200%, depending on the size of the spheres, can be achieved while maintaining acceptable product quality. Processes in accordance with the present invention can be performed using one or more of a number of methods of oxygen boosting, exemplars of which include the following.

I. Single oxygen lance injection: Single oxygen lance injection is performed upstream of the air-fuel burners 112 (see FIG. 2). The oxygen lance 202 is used to inject high velocity oxygen in the center of the vertical furnace 200. The lance is made in a shape of a periscope (i.e., approximately 90° angle) for piping convenience, although other similar configurations are also aspects of the present invention. By way of example and not of limitation, the exit nozzle of the lance 202 can have an internal diameter between about 0.5 inches (1.27 cm) and about 2.0 inches (5.08 cm), although those of skill in the art will readily appreciate that either smaller or larger diameters are also usable in the present invention. The air-fuel burner flame stoichiometry (equivalence ratio, E) is adjusted such that it is always on the rich side. The preferred ratio range is about $0.7 \leq E \leq 1.00$. The rich firing generates a large amount of carbon monoxide (CO), unburnt fuel, soot, and other hydrocarbons. The subsequent combustion of the above products using the oxygen jet $J_{O2}$ from lance 202 and the entrained ambient air $A_i$ creates a very luminous flame. The visible flame radiation provides more uniform heat transfer to the glass particles without creating hotspots.

Figure 2:
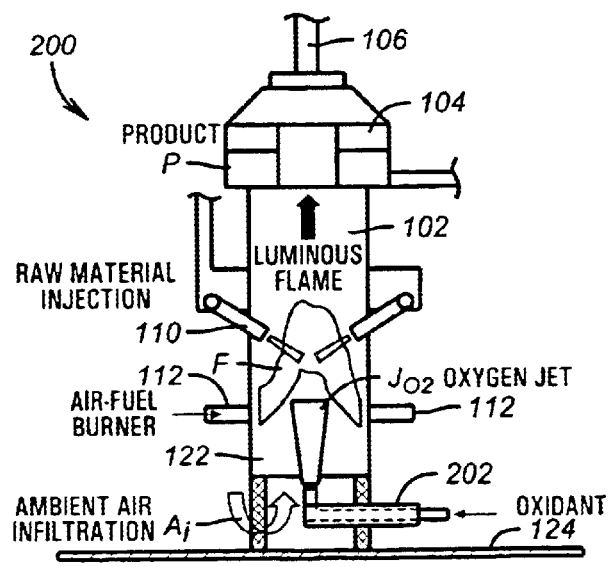
FIG. 2 illustrates a vertical glass furnace in accordance with a first embodiment of the present invention.

The location of an oxygen lance 202 can be very important from the overall process point of view. The lance is strategically located in the center of the furnace at the bottom. The location of the lance is dependent on the oxygen jet penetration into the furnace gas. As illustrated in FIG. 2, the oxygen jet $J_{O2}$ is centered and it gradually merges with the products of combustion from air-fuel combustion. The gradual mixing provides an increase in flame gas temperature in a uniform fashion. The resulting flame gases travel upwards with increased radiative properties. The visible radiation of this flame produces additional availability of heat flux for the glass particle spheroidization process. Productivity can improve with the additional radiation.

One aspect of the present invention includes that the oxygen injection can be performed with a single (e.g., SS-304 stainless steel) lance 202. The lance is wellsupported underneath the furnace using a support having the flexibility to change injection distance by several feet. A particularly preferred injection location is between about 2 feet (0.61 m) to 12 feet (3.66 m) below the air-fuel burners. This is achieved by using a support with an adjustment mechanism in all three (x, y, z) directions. The oxygen is preferably injected at a velocity between about 500 ft/s (152.5 m/s) and about 800 ft/s (243.9 m/s). The entrainment of ambient air from the bottom and/or sides of the furnace is enhanced by higher reaction rates with oxy combustion. The particular configuration of an adjustment mechanism will be readily apparent to one of skill in the art.

The amount of oxygen injected can be varied to accommodate the operating parameters of the furnace. For example, the flow rate can be between about 200 scfh (standard cubic feet per hour) and about 30,000 scfh, depending on the size, overall firing rate, and production rate of the furnace. The oxygen proportion injected can be between about 5% and about 30% of the theoretical oxidant needed for the air-fuel burners. The oxygen flow is adjusted to either increase or decrease overall flame gas temperatures for a desired bead quality and production rate. Those of skill in the art are very familiar with the considerations given to the adjustment of these furnace parameters, and will therefore not be further detailed herein.

The air-fuel burners 112, of which there are typically several positioned around the furnace wall, are generally fired at a constant firing rate, whereas the amount of oxygen flow from injection through lance 202 is adjusted to optimize the bead quality. The bead quality is generally assessed or expressed by the spherical shape of the product P. These beads are generally passed through a rolling sphere test. The rolled beads vs. non-spherical (difficult to roll) beads' relative weight percentages are measured to assess bead quality. A second test involves measuring the mesh number of the beads using various sieves. The beads are typically made for certain sieve number (40, 60, etc.).

Figure 3:
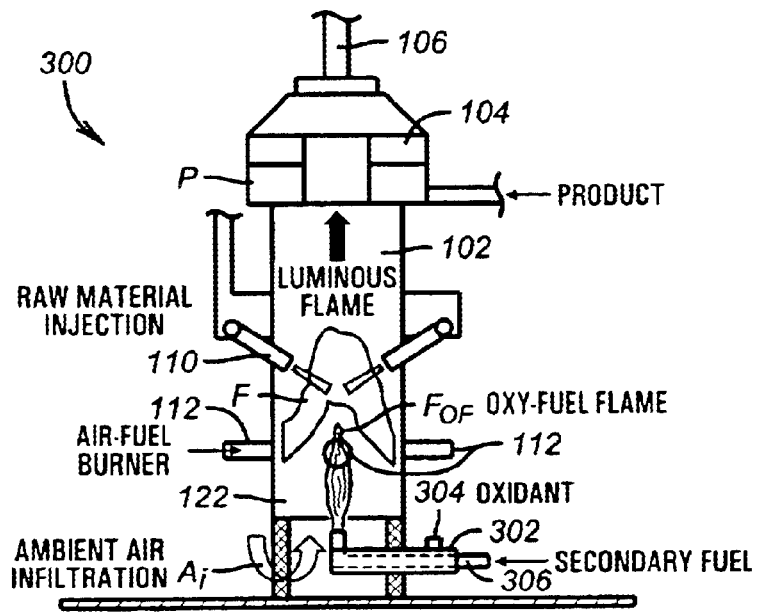
FIG. 3 illustrates a vertical glass furnace in accordance with a second embodiment of the present invention.

II. Oxy-fuel burner firing: Another aspect of the present invention involves oxy-fuel burning performed upstream of the air-fuel burners 112, as illustrated in FIG. 3. The oxy-fuel burner flame $F_{OF}$ stoichiometry (oxidant/fuel ratio, R) is adjusted such that it is always on the rich side. The preferred ratio range is $0.5 \leq R \leq 2.00$. The rich firing generates a large amount of carbon monoxide (CO), unburnt fuel, soot and other hydrocarbons. The subsequent combustion of these products creates a very luminous flame. The visible flame radiation provides uniform heat transfer to the glass particles without creating hotspots.

The location of one or more oxy-fuel burners 302 can also be very important from the overall process point of view. The burner is strategically located in the center of the furnace 300 at the bottom, and the location of the burner is dependent on the oxy-fuel flame length. As shown in FIG. 3, the oxy-fuel flame $F_{OF}$ is centered and it gradually merges with the products of combustion from air-fuel combustion. The gradual mixing provides an increase in flame gas temperature in a uniform fashion. The resulting flame gases travel upwards with increased radiative properties. The visible radiation of this flame produces additional availability of heat flux for glass particle spheroidization process. The productivity can improve with the additional radiation.

Figure 4:
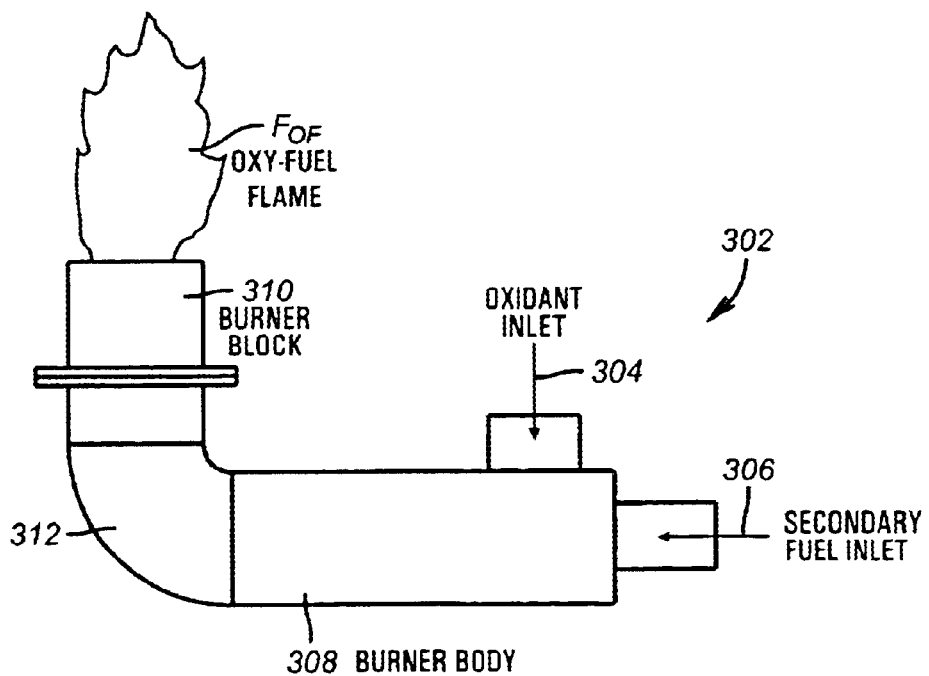
FIG. 4 illustrates portions of the vertical glass furnace in accordance with the second embodiment of the present invention, illustrated in FIG. 3.

FIG. 4 illustrates an example of an oxy-fuel burner 302 usable in the present invention. The burner 302 includes an oxidant inlet 304, a secondary fuel inlet 306, both of which lead to a burner body 308. A burner block 310 is connected to an elbow 312 at a flange 314. While the angle of elbow 312 is illustrated to be roughly 90 degrees, those of skill in the art will readily appreciate that it is desirable in some circumstances to direct flame $F_{OF}$ in another direction, for which it may be useful to configure elbow 312 at a different direction, or to mount the burner 302 at a different orientation relative to the vertical axis of the furnace shaft. As suggested by the illustration of FIG. 4, the burner body 308 can be configured to conduct the oxidant and fuel along separate, coaxial flow passages; however, the (unillustrated) flow passages through burner body 308 can also be non-coaxial parallel passages, or other configurations well known to those of skill in the art. Additionally, the oxidant and fuel inlets can be reversed.

Figure 5:
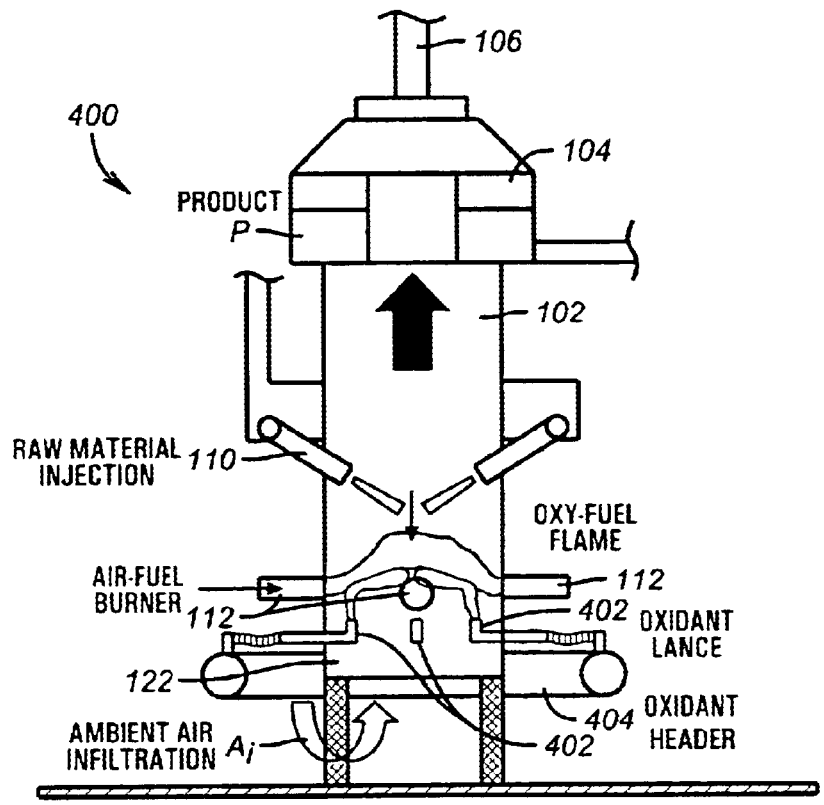
FIG. 5 illustrates a vertical glass furnace in accordance with a third embodiment of the present invention.
Figure 6:
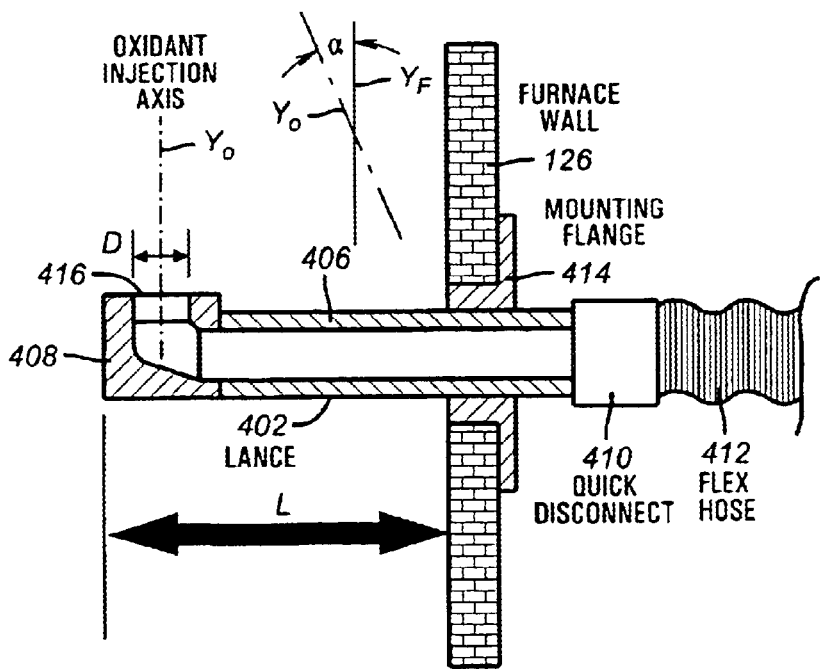
FIG. 6 illustrates portions of the vertical glass furnace in accordance with the third embodiment of the present invention, illustrated in FIG. 5.

III. Multiple oxygen lances upstream of the air-fuel burner: Yet another aspect of the present invention involves multiple oxygen lances upstream of the air-fuel burner(s). According to this aspect of the present invention, multiple lances 402 are positioned fluidly before the air-fuel burners in the entrained air stream to inject oxygen streams into the air-fuel burner flame. One embodiment of such as oxygen injection system and method 400 is illustrated in FIGS. 5 and 6.

The injection method is very specific to distribute oxygen gradually into the flame root (at very low injection velocity, e.g., between about 1 ft/s (0.30 m/s) and about 100 ft/s (30.5 m/s)). This relatively low injection velocity is preferably used to prevent immediate mixing of oxygen in the air-fuel flame core and creation of hot spots. The gradual oxygen injection allows slower mixing and more uniform subsequent flame gas temperature profile. The objective of this oxygen injection is to increase average flame gas temperatures (and heat release rate) for additional glass particle processing. The amount of oxygen lancing can be anywhere from about 1000 scfh to 50,000 scfh, depending on the furnace production capacity. The above can result in between 21.5% to 60% enrichment of the combustion air necessary for the air-fuel burners.

The implementation of the techniques described herein, either individually or together, can result in increased furnace capacity to process glass particles. Without being limited to a particular range, it is estimated that 50% to 200% increases in production can be obtained using techniques in accordance with the present invention. An additional advantage of the above techniques is the ability to retrofit oxygen burner and lance equipment without long-term furnace shutdown. The capital costs of the above systems are also very low compared to a furnace rebuild for larger capacity.

Figure 8:
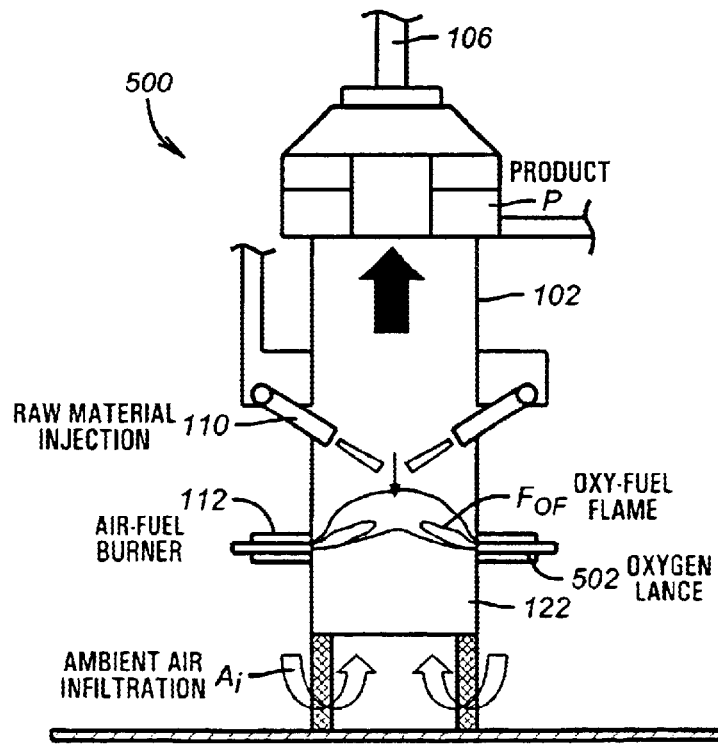
FIG. 8 illustrates a vertical glass furnace in accordance with a fourth embodiment of the present invention.

IV. Lances inserted into the air-fuel burners: A further aspect of the present invention includes at least one, and preferably multiple lances inserted into the air-fuel burners, as illustrated schematically in FIG. 8. This injection system 500 and method allows oxygen injection directly into the air-fuel flame $F_{AF}$ to increase its temperature. The injection is done into each burner using an oxidant lance 502 to allow a homogeneous oxygen distribution within the flame to avoid hot spots. The injection is done at low velocity, e.g., between about 30 ft/s (9.15 m/s) and about 100 ft/s (30.49 m/s), for reasons similar to those presented above. Those of skill in the art are well acquainted with various configurations of lances in air-fuel burners, and details thereof will not be included here so as not to obscure the present invention.

Figure 9:
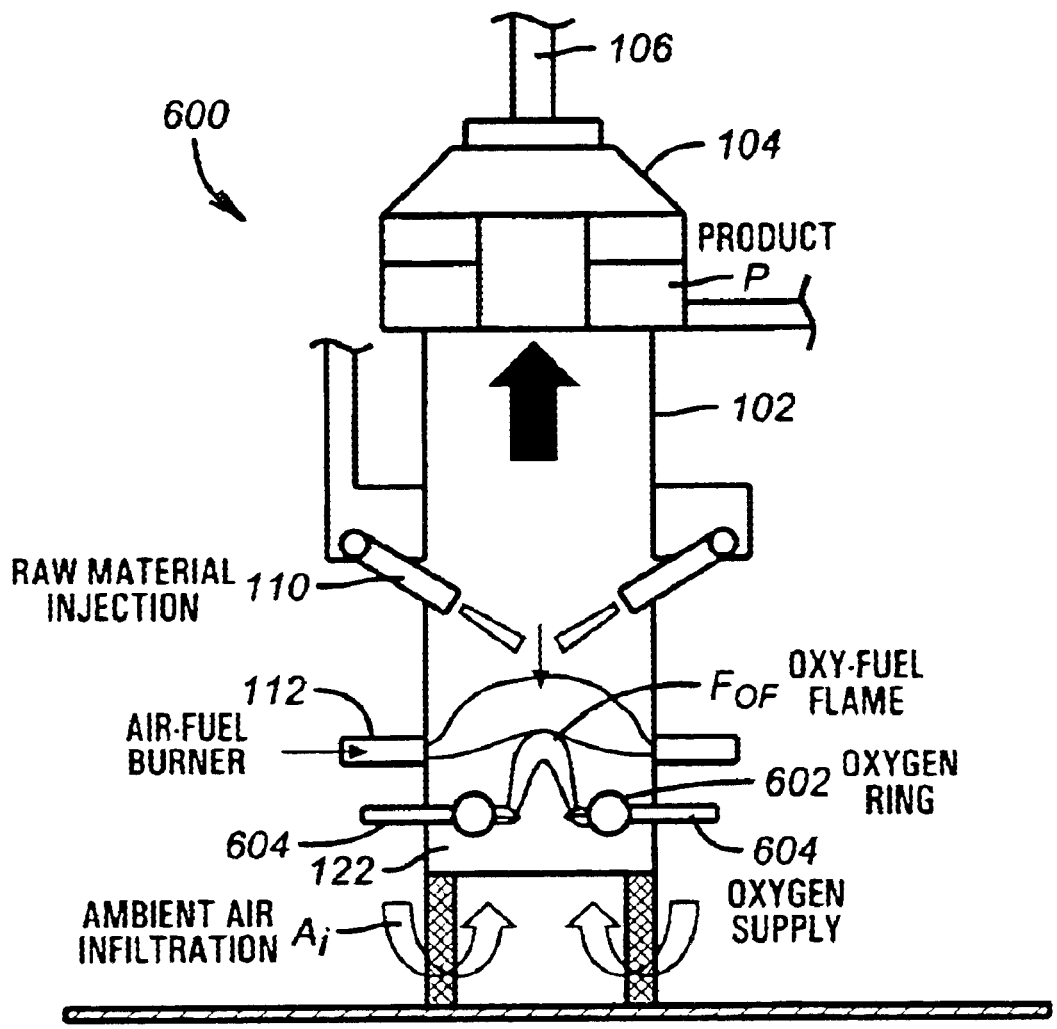
FIG. 9 illustrates a vertical glass furnace in accordance with a fifth embodiment of the present invention.

V. Oxygen injection utilizing an injection ring: Yet another aspect of the present invention includes utilization of an oxygen injection ring 602, such as that illustrated in FIG. 9, to inject oxygen below the air-fuel flame. Oxygen mixes with the air entrained at the bottom of the furnace to participate in combustion. The air flowing through the air-fuel burner 112 can be reduced to achieve higher flame temperatures. This system and method facilitates the mixing of air with oxygen to generate an homogeneous flame temperature. The oxygen injection velocity is preferably between about 30 ft/s (9.15 m/s) and about 200 ft/s (61 m/s). As illustrated in FIG. 9, the oxidant is supplied to the ring 602 via appropriate supplies 604.

The injection ring is advantageously positioned at a vertical distance H (see FIG. 7) from the air-fuel burner center axis. H is preferably between about 6 inches (15.25 cm) and 36 inches (0.91 m), depending on the size of the furnace 600. The outside diameter of the oxygen injection ring 602 should be adjusted to the furnace geometry. For example, the ratio $D_R/D_F$ can be anywhere on the range 0.2 to 0.9, wherein $D_R$ is the outer diameter of the oxygen injection ring, and $D_F$ is the inner diameter of the furnace shaft 102.

According to yet further aspects of the present invention, the oxygen lances and oxy-fuel burner preferably are formed of metallic materials. They have a periscope shape (90° outlet) to reduce exposure of burner parts (such as oxygen and fuel inlets) to thermal radiation and also facilitate burner installation. It is preferably mounted on a structural frame member, so it can be pulled out of the firing or injection position using a simple sliding mechanism.

During single oxygen lance operation or during multiple oxygen lance operation, the air-fuel burner equivalence ratio is adjusted between about 0.7 and about 1.00 (i.e., fuel-rich), and the remaining oxidant for combustion is supplied through the oxygen lance and entrained ambient air from the bottom of the furnace.

During oxy-fuel burner firing, the oxy-fuel burner firing stoichiometry is adjusted anywhere between about 0.5 and about 2.00 (oxidant/fuel ratio). The oxy-fuel burner velocities are adjusted to give a very long, lazy, and luminous flame. The oxy-fuel burner products of combustion are allowed to mix with the air-fuel burner products of combustion. The resulting mixture has very highly visible radiation and offers higher overall heat transfer to the entrained glass particles.

The firing of an oxy-fuel burner also increases the amount of entrained air from the bottom of the furnace. Thus, the overall combustion gas volume is increased to match the increase in flame gas temperature. The net effect is higher glass particle entrainment capacity of the furnace gases. In addition, due to oxy-fuel burner products of combustion (water, $CO_2$, CO, soot particles, unburnt fuel, and other hydrocarbons) a very luminous flame is obtained, in contrast to a bluish or non-luminous flame generated by air-fuel burners. The water and $CO_2$ components due to oxy-fuel firing also offer higher effective heat transfer to the glass particles.

The single oxygen lance, oxy-fuel burner, or both, can be installed anywhere in the furnace shaft from about 2 feet (0.61 m) to 12 feet (3.66 m) below the air-fuel burner. The distance between oxygen lance/oxy-fuel burner and air-fuel burner depends on the oxygen injection rate, the oxy-fuel burner firing rate, or both. An objective for the single oxygen lance is to create good entrainment of ambient air underneath the furnace and create good mixing with the combustibles from air-fuel burner. An objective of the oxy-fuel flame is to minimize excessive penetration into the horizontally fired air-fuel burner flame.

The oxy-fuel burner can be oxy-gas (e.g., oxygen-natural gas) fired or can be oxygen-fuel oil (e.g. Diesel, bunker-C, etc.) fired, for example, depending on the availability and economics of secondary fuel. In the case of oxy-fuel oil firing, the resulting flames can be of higher visible radiation compared to oxy-gas firing. This should translate into even higher capacity to process glass particles.

The oxygen lance aspect of the present invention is followed in a manner which is consistent with oxy-fuel burner firing. The lance approach can be utilized simultaneously with the oxy-fuel burner approach. An exemplary oxygen lance is illustrated in FIG. 6.

As illustrated in FIG. 6, the oxygen lance 402 can be made out of high temperature alloy, refractory material, other similar high temperature material. The lance insertion length (L) is adjustable to obtain an optimum radial injection point for appropriate flame temperature development. The lance exit 416 has an internal diameter (D) selected to give an average injection velocity between about 1 ft/s (0.3 m/s) and about 100 ft/s (30.5 m/s).

Figure 7:
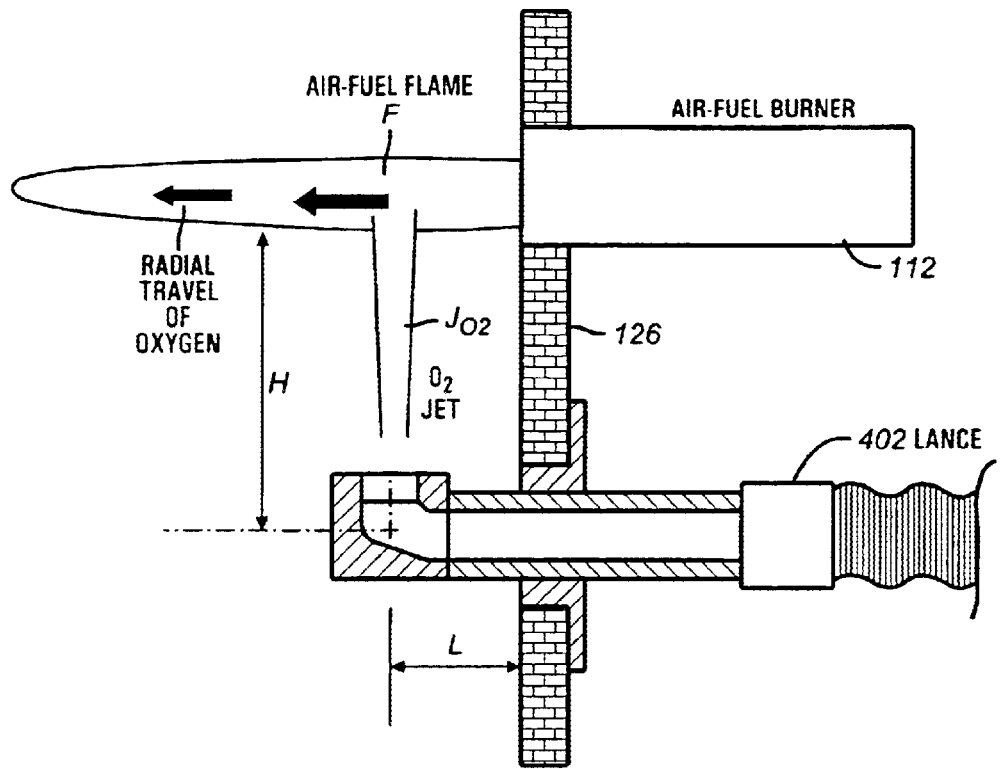
FIG. 7 illustrates portions of the vertical glass furnace in accordance with the third embodiment of the present invention, illustrated in FIG. 5.

The oxygen injection velocities are kept lower to delay combustion and prevent any hotspots in the air-fuel flame structure. This is illustrated in FIG. 7, where the injected oxygen stream $J_{O2}$ travels radially outward by riding on the underside of the air-fuel flame F. The oxygen is consumed (by reacting with combustibles in the air-fuel flame) as it travels radially outward. The oxygen jet penetration is prevented by selecting an appropriate nozzle diameter (D). The low velocity oxygen is injected at the air-fuel flame root, and it is immediately dragged towards the flame tip due to air-fuel burner radial momentum. The advantage of low velocity oxygen injection is to delay combustion or allowing a controlled combustion due to the presence of oxygen. The controlled combustion can prevent excessive air-fuel flame temperatures and also uniform flame temperature profile, qualitatively shown in the schematic of FIG. 7.

The vertical height (H) and the lance insertion point (L) are adjusted in consideration of the air-fuel burner firing rate and flame characteristics. As shown in FIG. 7, the height (H) can be anywhere from about 6 inches (15.25 cm) to about 36 inches (0.91 m), and the insertion length (L) can be between about 2 inches (5.08 cm) and about 48 inches (1.22 m), depending on the furnace shell internal diameter.

The oxygen injection can be performed at an axis $Y_O$ other than 900° (see FIG. 6). The injection angle α can be varied between about 0° and about 80° to suit air-fuel burner flame characteristics, by corresponding changes in the geometry of the lance 402, including elbow 408, or reorientation of the lance relative to the furnace.

The number of oxygen lances can be same as the number of air-fuel burners according to yet further aspects of the present invention, or it can be higher to suit additional injection of oxygen gas. The oxygen can be supplied from an oxygen header or manifold 404, as shown in FIG. 5. From the header 404, the oxygen is then uniformly distributed to all individual lances using a flexible hose connection. The flex hose 412 is then connected by a quick disconnect device 410 to install or remove lance from the furnace wall 126.

Various aspects of the present invention can have a number of benefits in vertical glass furnaces. Oxygen boosting by lance, burner, or both, can be retrofitted into an existing air-fuel fired reaction chamber, including those which are air or water cooled.

By boosting the combustion process with oxygen equivalent to 5% to 60% of the theoretical amount required for complete combustion, an increase in the furnace production from 50% to 200% can be realized, the defect rate can decrease by 50%, and the percentage of spherical to non-spherical product can increase to greater than 90%.

While the invention has been described in detail with reference to preferred embodiments thereof, it will be apparent to one skilled in the art that various changes can be made, and equivalents employed, without departing from the scope of the invention. All of the aforementioned documents are incorporated by reference in each of their entireties herein.

What is claimed is:

1. A process of operating a vertical glass bead furnace, the furnace including a shaft open at the bottom, a raw material addition device, and an air-fuel burner, comprising the steps of:

firing the air-fuel burner and thereby entraining air into the furnace shaft through the open bottom of the shaft;

adding raw material into the furnace; and an at least one additional step selected from the group consisting of (a) injecting oxidant into the shaft upstream of the air-fuel burner using a single lance;

(b) operating an oxy-fuel burner in the shaft upstream of the air-fuel burner;

(c) injecting oxidant into the shaft upstream of the air-fuel burner using multiple lances;

(d) injecting oxidant into the shaft using a lance incorporated into the center of the air-fuel burner; and (e) injecting oxidant into the shaft upstream of the air-fuel burner using an oxidant injection ring.

2. A process in accordance with claim 1, wherein the additional step comprises injecting oxidant into the shaft adjacent to the shaft bottom using a single lance.

3. A process in accordance with claim 2, wherein the step of injecting oxidant using a single lance comprises injecting oxidant upward along the center of the furnace.

4. A process in accordance with claim 2, wherein the step of firing an air-fuel burner comprises firing with an equivalence ratio E, $0.7 \leq E \leq 1.0$.

5. A process in accordance with claim 2, wherein the step of injecting oxidant using a single lance comprises injecting oxidant at a velocity between about 500 ft/s and about 800 ft/s.

6. A process in accordance with claim 1, wherein the additional step comprises operating an oxy-fuel burner in the shaft adjacent to the shaft bottom.

7. A process in accordance with claim 6, wherein the step of operating an oxy-fuel burner adjacent to the shaft bottom comprises operating an oxy-fuel burner with a flame stoichiometry R, with $0.5 \leq R \leq 2.0$.

8. A process in accordance with claim 6, wherein the step of operating an oxy-fuel burner adjacent to the shaft bottom comprises operating an oxy-fuel burner directed upward along the center of the furnace.

9. A process in accordance with claim 1, wherein the additional step comprises injecting oxidant into the shaft adjacent to the shaft bottom using multiple lances.

10. A process in accordance with claim 9, wherein the step of injecting oxidant into the shaft adjacent to the shaft bottom using multiple lances comprises injecting oxidant at a velocity between about 1 ft/s and about 100 ft/s.

11. A process in accordance with claim 9, wherein the step of injecting oxidant using multiple lances comprises injecting at an angle relative to the vertical axis of the furnace, with $0° \leq \alpha \leq 80°$.

12. A process in accordance with claim 1, wherein the additional step comprises injecting oxidant into the shaft using a lance incorporated into the air-fuel burner.

13. A process in accordance with claim 12, wherein the step of injecting oxidant into the shaft using a lance incorporated into the air-fuel burner comprises injecting oxidant at a velocity between about 30 ft/s and about 100 ft/s.

14. A process in accordance with claim 1, wherein the additional step comprises injecting oxidant into the shaft adjacent to the shaft bottom using an oxidant injection ring.

15. A process in accordance with claim 14, wherein the step of injecting oxidant into the shaft adjacent to the shaft bottom using an oxidant injection ring comprises injecting oxidant at a velocity between about 30 ft/s and about 200 ft/s.

16. A process in accordance with claim 14, wherein the furnace has an internal diameter $D_F$, and wherein the step of injecting using an injection ring comprises injecting using an injection ring having an external diameter $D_R$, and wherein $0.2 \leq D_R/D_F \leq 0.9$.

17. A vertical glass furnace comprising:

a shaft having an interior space and open at the bottom;

a raw material addition device mounted so to add raw material to the interior of the shaft;

an air-fuel burner; and an additional device selected from the group consisting of:

(a) a single oxidant injection lance upstream of the air-fuel burner useful for injecting oxidant into the shaft;

(b) an oxy-fuel burner in the shaft upstream of the air-fuel burner;

(c) multiple oxidant injection lances upstream of the air-fuel burner useful for injecting oxidant into the shaft;

(d) a lance incorporated into the center of the air-fuel burner; and (e) an oxidant injection ring positioned for injecting oxidant into the shaft upstream of the air-fuel burner.

18. A vertical glass furnace in accordance with claim 17, wherein the device comprises a single oxidant injection lance adjacent to the shaft bottom useful for injecting oxidant into the shaft.

19. A vertical glass furnace in accordance with claim 18, wherein the furnace has a center, and wherein the single lance is directed upward along the center of the furnace.

20. A vertical glass furnace in accordance with claim 17, wherein the device comprises an oxy-fuel burner in the shaft adjacent to the shaft bottom.

21. A vertical glass furnace in accordance with claim 20, wherein the furnace comprises a center, and wherein the oxy-fuel burner is directed upward along the center of the furnace.

22. A vertical glass furnace in accordance with claim 17, wherein the device comprises multiple oxidant injection lances adjacent to the shaft bottom useful for injecting oxidant into the shaft.

23. A vertical glass furnace in accordance with claim 22, wherein the furnace has a vertical axis, and wherein the multiple lances are each oriented to inject at an angle relative to the vertical axis of the furnace, with $0° \leq \alpha \leq 80°$.

24. A vertical glass furnace in accordance with claim 17, wherein the device comprises a lance incorporated into the air-fuel burner.

25. A vertical glass furnace in accordance with claim 17, wherein the device comprises an oxidant injection ring positioned for injecting oxidant into the shaft adjacent to the shaft bottom.

26. A vertical glass furnace in accordance with claim 25, wherein the furnace has an internal diameter $D_F$, wherein the injection ring has an external diameter $D_R$, and wherein $0.2 \leq D_R/D_F \leq 0.9$.

* * * * *